United States Patent
Huang et al.

(10) Patent No.: US 12,399,581 B1
(45) Date of Patent: Aug. 26, 2025

(54) TOUCHPAD MODULE

(71) Applicant: Primax Electronics Ltd., Taipei (TW)

(72) Inventors: Wei-Chiang Huang, Taipei (TW);
Wei-Ping Chan, Taipei (TW);
Ruey-Piin Wang, Taipei (TW);
Ming-Hui Yeh, Taipei (TW);
Tung-Heng Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/965,794

(22) Filed: Dec. 2, 2024

(30) Foreign Application Priority Data

Feb. 26, 2024 (TW) .................................. 113106854

(51) Int. Cl.
*G06F 3/0354* (2013.01)
*G06F 3/041* (2006.01)

(52) U.S. Cl.
CPC ........ *G06F 3/03547* (2013.01); *G06F 3/0418* (2013.01); *G06F 2203/04105* (2013.01)

(58) Field of Classification Search
CPC ............... G06F 3/03547; G06F 3/0418; G06F 2203/04105
See application file for complete search history.

(56) References Cited

U.S. PATENT DOCUMENTS

| | | | |
|---|---|---|---|
| 11,726,584 B1* | 8/2023 | Huang .................... | G06F 1/169 |
| | | | 345/157 |
| 2023/0333656 A1* | 10/2023 | Liu ......................... | G01L 1/122 |

* cited by examiner

*Primary Examiner* — Afroza Chowdhury
(74) *Attorney, Agent, or Firm* — KIRTON McCONKIE; Evan R. Witt (57) ABSTRACT

A touchpad module includes an elastic bracket, a touch member, a plurality of connecting elements and a pressure sensing unit. The elastic bracket includes a plurality of cantilevers. The plurality of cantilevers have respective free ends and respective fixed ends. The plurality of connecting elements are connected with the respective free ends and the touch member. When the touch member is pressed in response to an external force, the external force is transmitted to at least one free end through at least one connecting element, the at least one free end is rotated relative to the at least one fixed end in a direction away from the touch member, and the pressure sensing unit is subjected to deformation. According to the deformation, the pressure sensing unit senses a magnitude of a pressing force exerted on the touch member and generates a corresponding pressure sensing signal.

13 Claims, 7 Drawing Sheets

TOUCHPAD MODULE

FIELD OF THE INVENTION

The present invention relates to a touch input device, and more particularly to a touchpad module.

BACKGROUND OF THE INVENTION

With increasing development of science and technology, a variety of electronic devices are designed in view of convenience and user-friendliness. For helping the user well operate the electronic devices, the electronic devices are gradually developed in view of humanization. For example, the common electronic devices include notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

For example, in case that the user's finger is placed on the touchpad and slid on the touchpad, a cursor shown on a display screen is correspondingly moved. Moreover, in case that the touchpad is pressed down by the user's finger, the electronic device executes a specified function. The use of the touchpad can implement some functions of the conventional mouse. In other words, the user may operate the electronic device through the touchpad without the need of additionally carrying or installing the mouse.

Furthermore, more and more touchpads are equipped with pressure sensors. When the touchpad is pressed by the user's finger, a pressing force of the user applied to the touchpad is detected by the pressure sensor. Consequently, a pressure sensing signal is outputted. According to the pressure sensing signal, the electronic device executes the corresponding function.

Nowadays, a plurality of pressure sensors are installed on the peripheral region of the touchpad. When the touchpad is pressed down, a cantilever structure of the touchpad is pushed and subjected to deformation. According to the deformation amount of the cantilever structure, the pressure sensor senses the magnitude of the pressing force that is exerted on the touchpad. As mentioned above, the structure of the conventional touchpad is complicated, and the fabricating cost of the touchpad is high.

Therefore, it is important to provide an improved touchpad module with simplified structure and reduced fabricating cost.

SUMMARY OF THE INVENTION

An object of the present invention provides an improved touchpad module.

The other objects and advantages of the present invention will be understood from the disclosed technical features.

In accordance with an aspect of the present invention, a touchpad module for a computing device is provided. The touchpad module is installed within a fixing frame of the computing device. The touchpad module includes an elastic bracket, a touch member, a plurality of connecting elements and a pressure sensing unit. The elastic bracket includes a plurality of cantilevers. The plurality of cantilevers have respective free ends and respective fixed ends. Each of the free ends is rotatable relative to the corresponding fixed end. The touch member is located over the elastic bracket. The touch member is movable relative to the elastic bracket. The plurality of connecting elements are installed on the corresponding free ends. The plurality of connecting elements are connected with the respective free ends and the touch member. The pressure sensing unit is arranged between the elastic bracket and the touch member. The pressure sensing unit is located near a geometric center of the elastic bracket and a geometric center of the elastic bracket of the touch member. When the touch member is pressed in response to an external force, the external force is transmitted to at least one free end of the free ends through at least one of the plurality of connecting elements, the at least one free end is rotated relative to the at least one fixed end in a direction away from the touch member, the touch member is moved toward the elastic bracket, and the pressure sensing unit is subjected to deformation. According to an amount of the deformation, the pressure sensing unit senses a magnitude of a pressing force exerted on the touch member and generates a corresponding pressure sensing signal. In an embodiment, the plurality of cantilevers are classified into a plurality of first cantilevers and a second cantilever. The first cantilevers are located near edges of the elastic bracket and the touch member. The second cantilever is located near the geometric center of the elastic bracket.

In an embodiment, the plurality of first cantilevers have respective first free ends and respective first fixed end, and the second cantilever has a second free end and a second fixed end. Each of the first free ends is rotatable relative to the corresponding first fixed end. The second free end is rotatable relative to the second fixed end.

In an embodiment, the plurality of connecting elements are classified into a plurality of first connecting elements and a second connecting element. The plurality of first connecting elements are respectively disposed on the first free ends of the corresponding first cantilevers. The second connecting element is disposed on the second free end of the second connecting element.

In an embodiment, the pressure sensing unit is installed on the second cantilever, and the pressure sensing unit is located beside the second connecting element.

In an embodiment, the second cantilever further includes a perforation, and the pressure sensing unit is accommodated within the perforation.

In an embodiment, the plurality of first connecting elements and the second connecting element are made of elastic material.

In an embodiment, the elastic material is liquid silicon rubber (LSR).

In an embodiment, the touch member has two long sides and two short sides. The two long sides are opposed to each other. The two short sides are opposed to each other. Each of the two long sides is adjacent to the two short sides. Each of the two short sides is adjacent to the two long sides. A length of the long side of the touch member is not greater than 120 mm. A length of the short side of the touch member is not greater than 70 mm.

In an embodiment, the pressure sensing unit is a microelectromechanical system (MEMS) accelerometer.

In an embodiment, the touch panel module further includes a flexible circuit board. The flexible circuit board is arranged between the touch member and the pressure sensing unit. The flexible circuit board is electrically connected with the touch member and the pressure sensing unit.

In an embodiment, the touch panel module further includes a control unit, and the control unit is installed on the

touch member. The control unit includes a firmware that calibrates a touch pressure sensitivity of the touch member.

In accordance with another aspect of the present invention, a computing device is provided. The computing device includes a casing, a processor and a touchpad module. A fixing frame is concavely formed in the casing. The processor is disposed within the casing. The touchpad module is disposed within the casing and electrically connected with the processor. The touchpad module includes an elastic bracket, a touch member, a plurality of connecting elements and a pressure sensing unit. The elastic bracket includes a plurality of cantilevers. The plurality of cantilevers have respective free ends and respective fixed ends. Each of the free ends is rotatable relative to the corresponding fixed end. The touch member is located over the elastic bracket. The touch member is movable relative to the elastic bracket. The plurality of connecting elements are installed on the corresponding free ends. The plurality of connecting elements are connected with the respective free ends and the touch member. The pressure sensing unit is arranged between the elastic bracket and the touch member. The pressure sensing unit is located near a geometric center of the elastic bracket and a geometric center of the elastic bracket of the touch member. When the touch member is pressed in response to an external force, the external force is transmitted to at least one free end of the free ends through at least one of the plurality of connecting elements, the at least one free end is rotated relative to the at least one fixed end in a direction away from the touch member, the touch member is moved toward the elastic bracket, and the pressure sensing unit is subjected to deformation. According to an amount of the deformation, the pressure sensing unit senses a magnitude of a pressing force exerted on the touch member and generates a corresponding pressure sensing signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
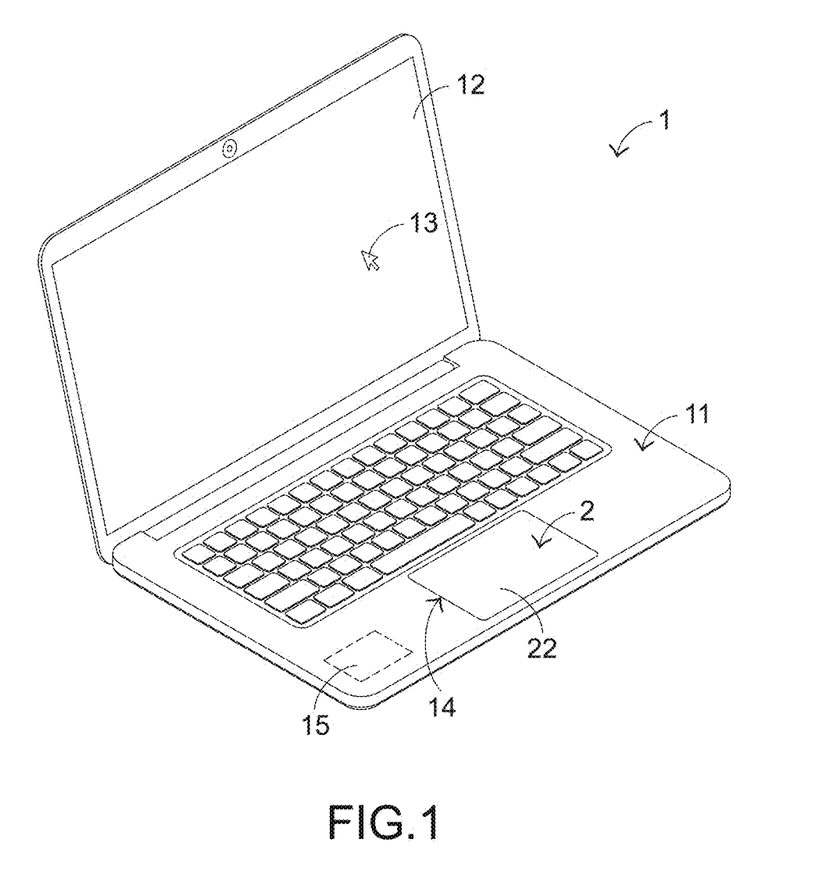
FIG. 1 is a schematic perspective view illustrating the outer appearance of a computing device with a touchpad module according to an embodiment of the present invention.
Figure 2:
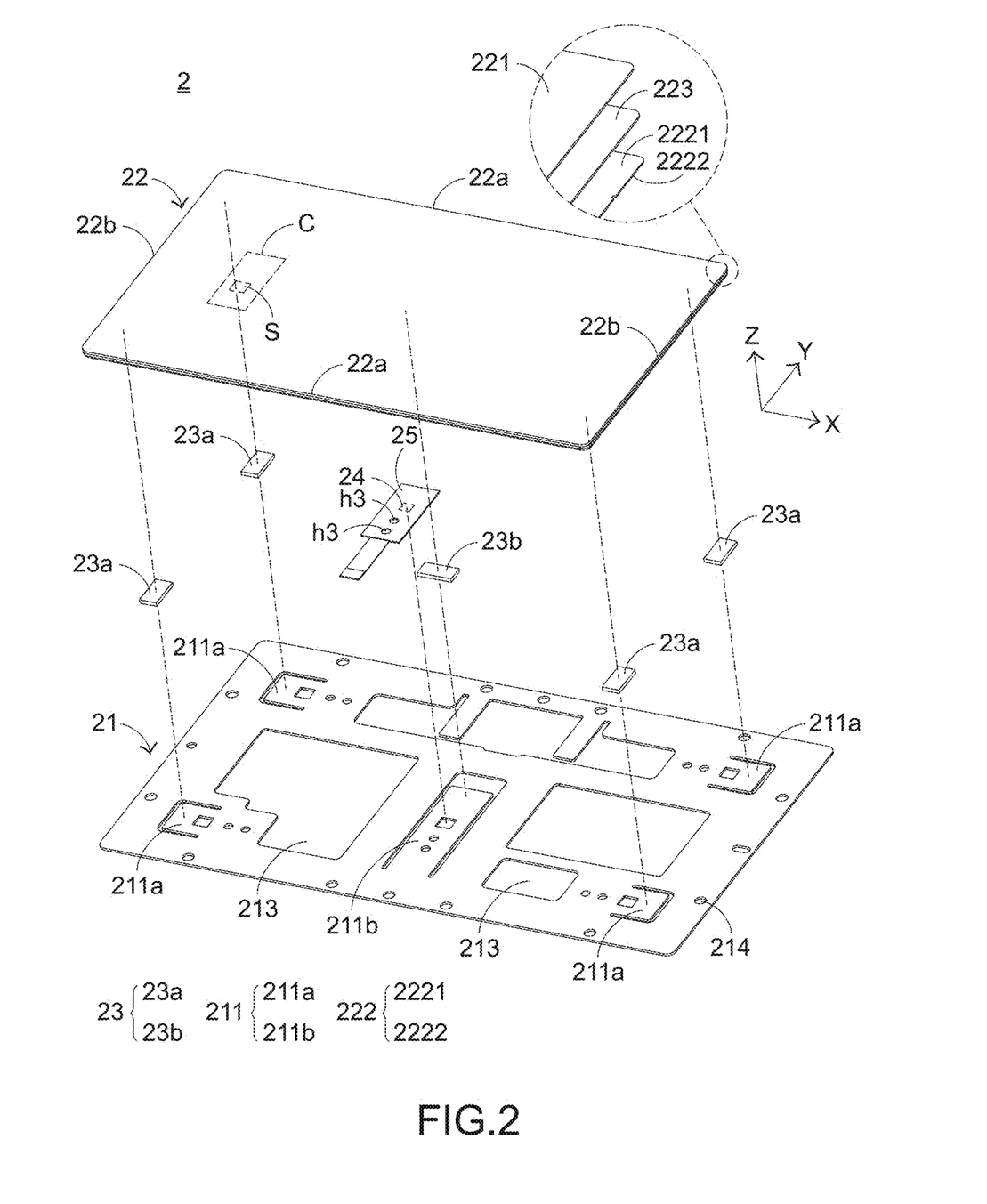
FIG. 2 is a schematic exploded view illustrating the structure of the touchpad module according to the embodiment of the present invention.
Figure 3:
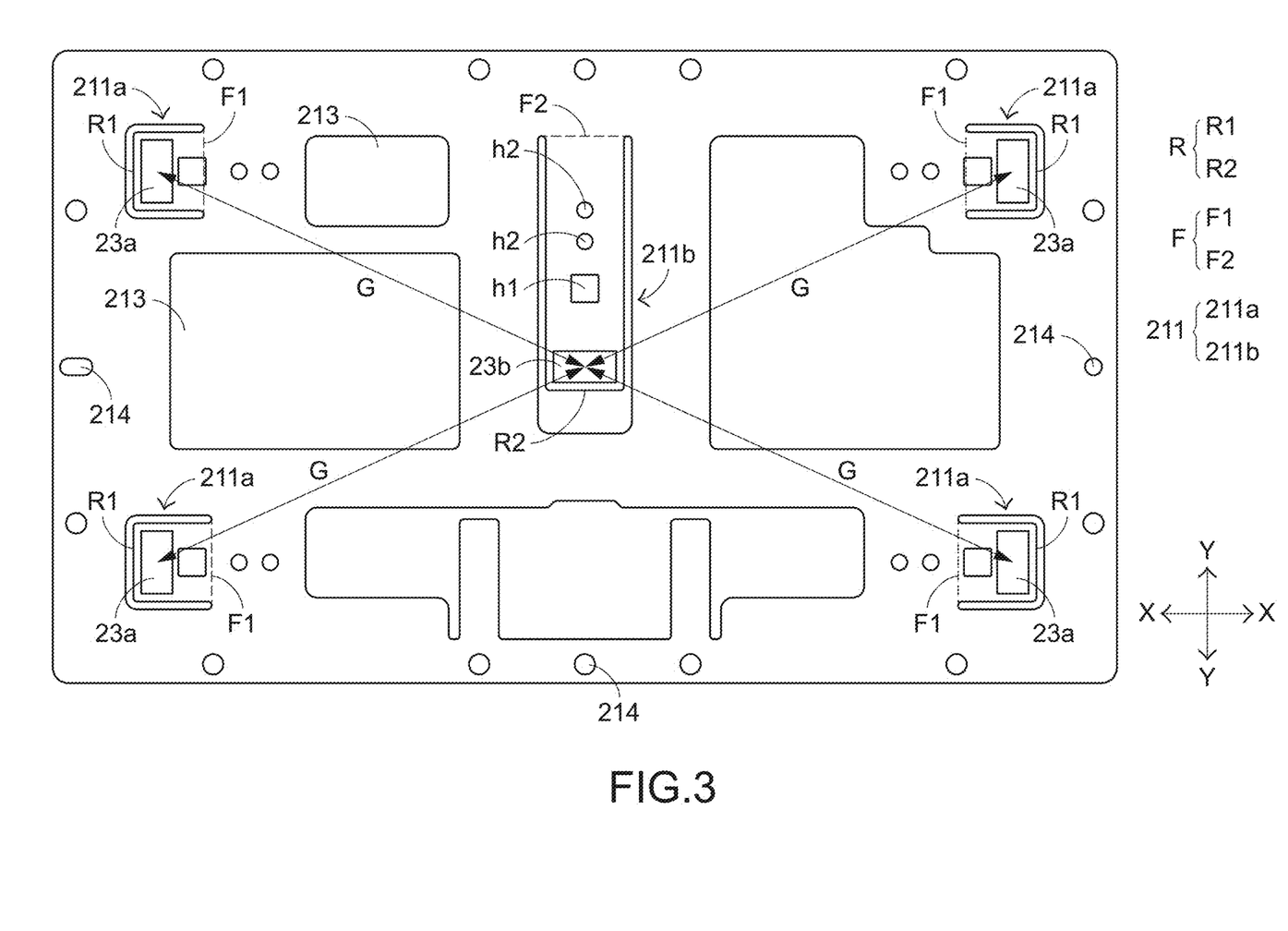
FIG. 3 is a schematic top view illustrating an elastic bracket, a plurality of first connecting elements and a plurality of second connecting elements in the touchpad module according to the embodiment of the present invention.
Figure 4A:
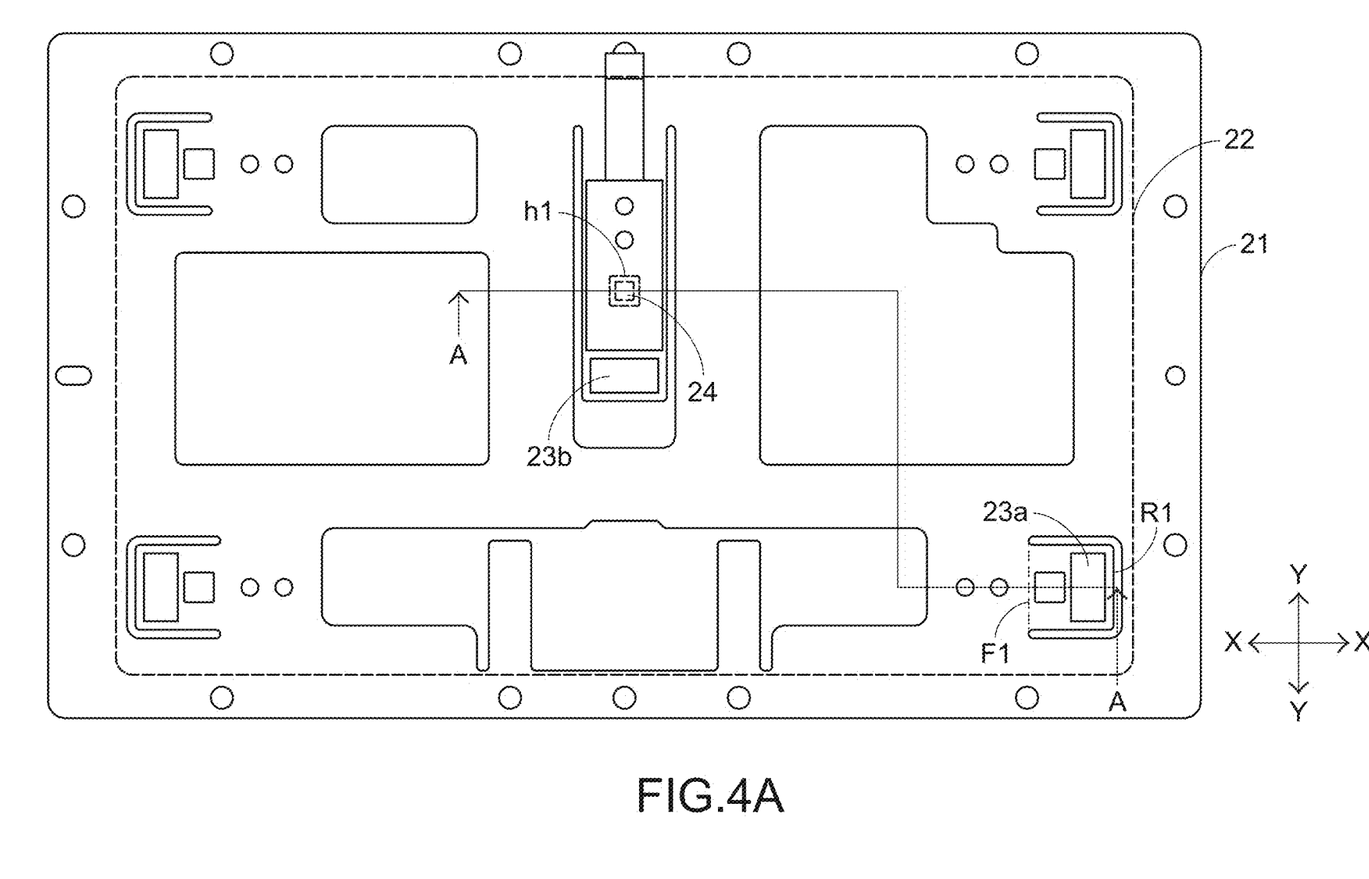
FIG. 4A is a schematic top view of the touch panel module before being pressed.
Figure 4B:
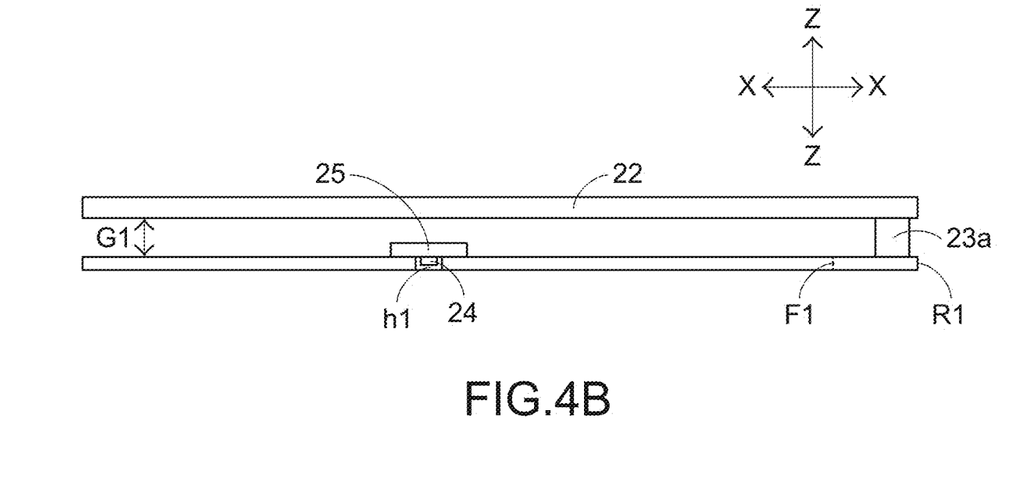
FIG. 4B is a schematic cross-sectional view illustrating the touch panel module shown in FIG. 4A and taken along the line A-A.
Figure 5A:
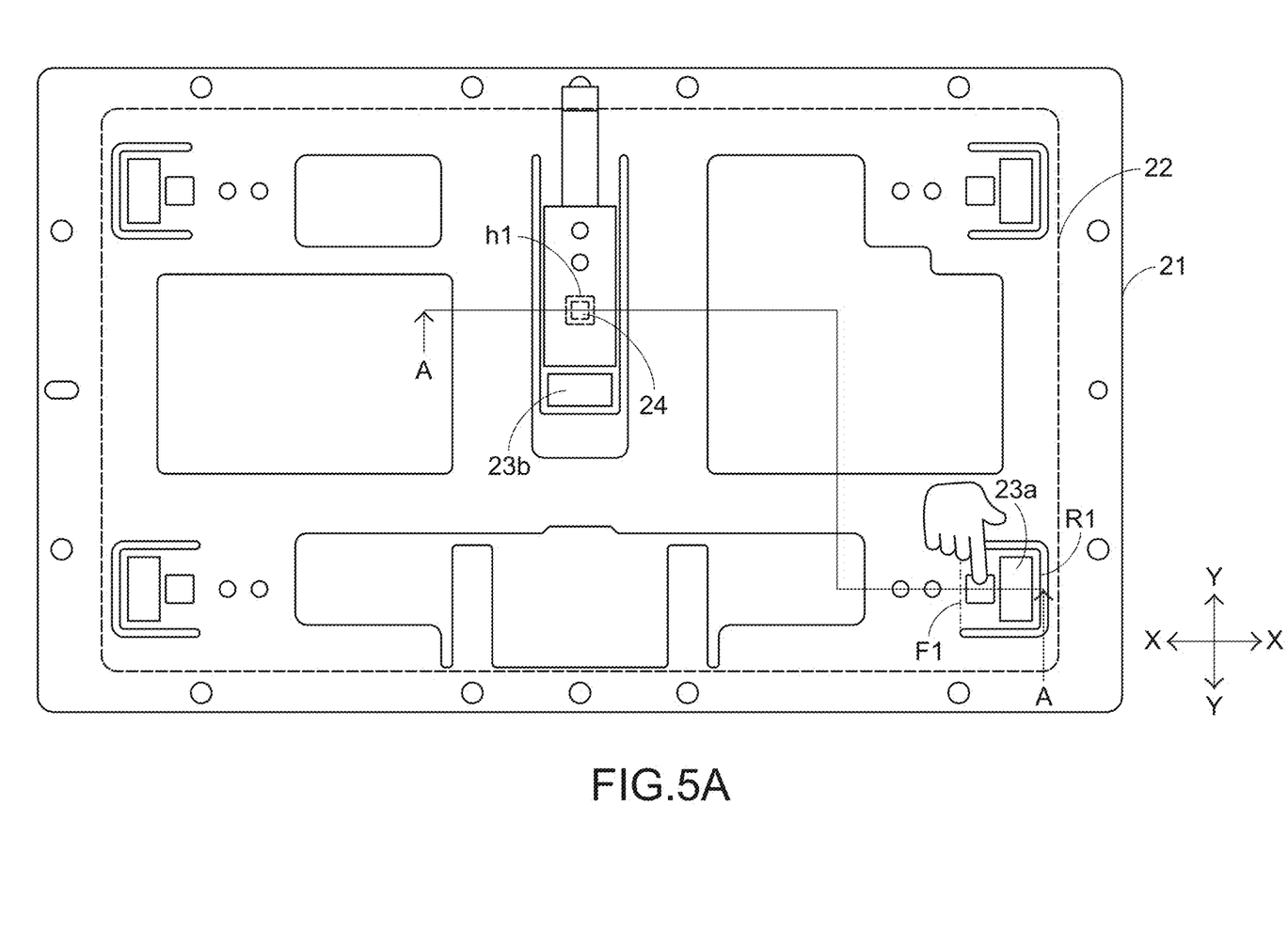
FIG. 5A is a schematic top view of the touch panel module after being pressed.
Figure 5B:
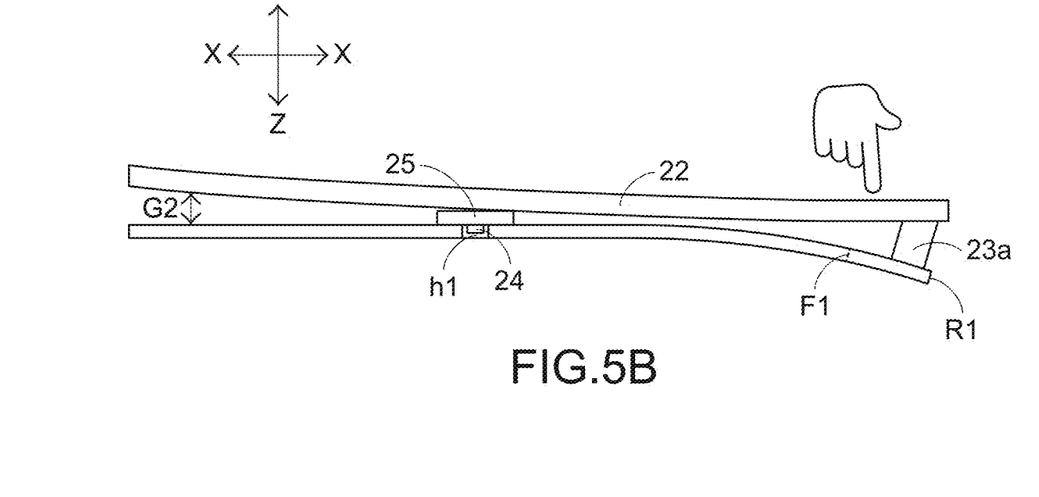
FIG. 5B is a schematic cross-sectional view illustrating the touch panel module shown in FIG. 5A and taken along the line A-A.

FIG. 1 is a schematic perspective view illustrating the outer appearance of a computing device with a touchpad module according to an embodiment of the present invention. FIG. 2 is a schematic exploded view illustrating the structure of the touchpad module according to the embodiment of the present invention. FIG. 3 is a schematic top view illustrating an elastic bracket, a plurality of first connecting elements and a plurality of second connecting elements in the touchpad module according to the embodiment of the present invention. FIG. 4A is a schematic top view of the touch panel module before being pressed. FIG. 4B is a schematic cross-sectional view illustrating the touch panel module shown in FIG. 4A and taken along the line A-A. FIG. 5A is a schematic top view of the touch panel module after being pressed. FIG. 5B is a schematic cross-sectional view illustrating the touch panel module shown in FIG. 5A and taken along the line A-A.

Please refer to FIG. 1, FIG. 2 and FIG. 3. The present invention provides a touchpad module 2 for a computing device 1. The touchpad module 2 is disposed in a fixing frame 14 of the computing device 1. In an embodiment, the touchpad module 2 includes an elastic bracket 21, a touch member 22, a plurality of connecting elements 23 and a pressure sensing unit 24.

The elastic bracket 21 includes a plurality of cantilevers 211. Each of the cantilevers 211 has a free end R and a fixed end F. The free end R can be rotated relative to the fixed end F. The touch member 22 is located over the elastic bracket 21. In addition, the touch member 22 is movable relative to the elastic bracket 21. The plurality of connecting elements 23 are installed on the corresponding free ends R, respectively. In addition, the plurality of connecting elements 23 are connected with the free ends R and the touch member 22. The pressure sensing unit 24 is arranged between the elastic bracket 21 and the touch member 22. In addition, the pressure sensing unit 24 is located near the geometric centers of the elastic bracket 21 and the touch member 22.

When the touch member 22 is pressed in response to an external force, the external force is transmitted to the at least one free end R through at least one of the connecting elements 23. The at least one free end R is rotated relative to the at least one fixed end F in the direction away from the touch member 22, and the touch member 22 is moved toward the elastic bracket 21. Consequently, the pressure sensing unit 24 is subjected to deformation. According to the deformation amount, the magnitude of the pressing force exerted on the touch member 22 is sensed by the pressure sensing unit 24. Consequently, the pressure sensing unit 24 issues a corresponding pressure sensing signal. The components of the touchpad module 2 will be described in more detail as follows.

An example of the computing device 1 includes but is not limited to a notebook computer. The computing device 1 includes a casing 11, a display screen 12, a processor 15 and the touchpad module 2. The processor 15 is disposed in the casing 11. The processor 15 is used for processing electronic signals of the computing device 1. Moreover, the fixing frame 14 is concavely formed in the casing 11. The touchpad module 2 is disposed in the fixing frame 14 and electrically connected with the processor 15. In addition, at least a portion of the touchpad module 2 is exposed outside so as to be touched by the user's finger. Consequently, the user can operate the touchpad module 2 to control the computing device 1. For example, in case that the user's finger is placed on the touchpad module 2 and slid on the touchpad module 2, a cursor 13 shown on the display screen 12 is correspondingly moved. Moreover, when the touchpad module 2 is pressed down by the user's finger, the computing device 1 executes a specified function.

Please refer to FIG. 2 and FIG. 3 again. The elastic bracket 21 is substantially a rectangular plate in appearance. Preferably but not exclusively, the elastic bracket 21 is made of elastic metallic material such as aluminum or iron. The elastic bracket 21 includes the plurality of cantilevers 211, at least one clearance hole 213 and a plurality of mounting holes 214.

The plurality of cantilevers 211 are formed by stamping the elastic bracket 21. These cantilevers 211 are used to support the connecting elements 23. These cantilevers 211 are classified into a plurality of first cantilevers 211a and at least one second cantilever 211b. The first cantilevers 211a are located near the edges of the elastic bracket 21. Each first cantilever 211a has a first free end R1 and a first fixed end F1. In addition, the first free end R1 is rotatable relative to the corresponding first fixed end F1. The second cantilever 211b is located near the geometric center of the elastic bracket 21. The second cantilever 211b has a second free end R2 and a second fixed end F2. In addition, the second free end R2 is rotatable relative to the second fixed end F2.

In an embodiment, the elastic bracket 21 includes four first cantilevers 211a and one second cantilever 211b. The four first cantilevers 211a are respectively arranged near four corners of the elastic bracket 21. The extension direction of the first cantilever 211a is in parallel with the X-axis. The extension direction of the second cantilever 211b is in parallel with the Y-axis. The extension direction of the first cantilever 211a is perpendicular to the extension direction of the second cantilever 211b.

The second cantilever 211b includes a perforation h1 and a plurality of positioning holes h2. The perforation h1 and the positioning holes h2 run through the second cantilever 211b. The pressure sensing unit 24 is accommodated within the perforation h1. Preferably but not exclusively, the perforation h1 has a rectangular shape or a circular shape. In this embodiment, the second cantilever 211b includes two positioning holes h2. The positioning hole h2 has a circular shape or any other appropriate shape.

The at least one clearance hole 213 is used to provide a clearance space for accommodating various electronic components. The size and shape of the clearance hole 213 are not restricted. For example, the clearance hole 213 has a rectangular shape, a circular shape or an irregular shape. The touchpad module 2 is fixed in the fixing frame 14 of the computing device 1 through the mounting holes 214. Preferably but not exclusively, the mounting holes 214 are screw holes. After a plurality of screws (not shown) are tightened into the corresponding mounting holes 214, the touchpad module 2 is fixed in the fixing frame 14 of the computing device 1.

Please refer to FIG. 2 again. The touch member 22 is substantially a rectangular plate in appearance. The touch member 22 has two long sides 22a and two short sides 22b. The two long sides 22a are opposed to each other. The two short sides 22b are opposed to each other. Each long side 22a is adjacent to the two short sides 22b. Each short side 22b is adjacent to the two long sides 22a. In an embodiment, the length of the long side 22a of the touch member 22 is not greater than 120 mm, and the length of the short side 22b of the touch member 22 is not greater than 70 mm.

In an embodiment, the touch member 22 includes a covering plate 221, a printed circuit board 222 and an adhesive layer 223. The covering plate 221 is located over the printed circuit board 222. That is, the covering plate 221 is arranged along the positive Z-axis direction of the printed circuit board 222. The adhesive layer 223 is arranged between the covering plate 221 and the printed circuit board 222. The covering plate 221 and the printed circuit board 222 are adhered to each other through the adhesive layer 223. The printed circuit board 222 has a first surface 2221 and a second surface 2222, which are opposed to each other. A touch sensing electrode (not shown) is installed on the first surface 2221 of the printed circuit board 222. When the user's finger touches or presses the touch member 20, the touch sensing electrode senses the touch position of the user's finger and outputs a corresponding touch sensing signal. In addition, a plurality of electronic components (not shown) are installed on the second surface 2222 of the printed circuit board 222. Preferably but not exclusively, the covering plate 221 is made of glass. The material of the covering plate 221 may be varied according to the practical requirements. The adhesive layer 223 is a double-sided adhesive layer. Preferably but not exclusively, the adhesive layer 223 is a double-sided tape or a pressure sensitive adhesive (PSA).

Please refer to FIG. 2 and FIG. 3 again. The plurality of connecting elements 23 are installed on the corresponding free ends R, respectively. In addition, the plurality of connecting elements 23 are connected with the plurality of free ends R and the touch member 22. The plurality of connecting elements 23 are made of elastic material. After the external force applied to the touch member 22 is eliminated, the cantilever 211 is restored to its unloaded initial state in response to the actions of the connecting elements 23. Preferably but not exclusively, the elastic material is liquid silicon rubber (LSR).

In an embodiment, the plurality of connecting elements 23 are classified into a plurality of first connecting elements 23a and at least one second connecting element 23b. The plurality of first connecting elements 23a are respectively disposed on the first free ends R1 of the corresponding first cantilever 211a. The second connecting element 23b is disposed on the second free end R2 of the second connecting element 23b. That is, the number of the first connecting elements 23a matches the number of the first free ends R1, and the number of at least one second connecting element 23b matches the number of the at least one second free end R2. In an implementation example, the touchpad module 2 includes four first connecting elements 23a and one second connecting element 23b. The four first connecting elements 23a are arranged near the edges of the elastic bracket 21 and the touch member 22, and the second connecting element 23b is arranged close to the geometric centers of the elastic bracket 21 and the touch member 22. In addition, there is a spacing distance G between each of the first connecting elements 23a and the second connecting element 23b. It is preferred that the spacing distance G is in the range between 55 mm and 62 mm.

Please refer to FIG. 2 and FIG. 4A. The pressure sensing unit 24 is arranged between the elastic bracket 21 and the touch member 22. In addition, the pressure sensing unit 24 is located near the geometric centers of the elastic bracket 21 and the touch member 22. In this embodiment, the pressure sensing unit 24 is installed on the second cantilever 211b. When the touch member 22 is pressed down, the pressure sensing unit 24 is subjected to deformation in response to the pressing force. Consequently, the pressure sensing unit 24 issues the corresponding pressure sensing signal.

In an embodiment, the touch panel module 2 further includes a flexible circuit board 25. The flexible circuit board 25 is arranged between the pressure sensing unit 24 and the printed circuit board 222. The flexible circuit board 25 is electrically connected with the pressure sensing unit 24 and the printed circuit board 222. After the pressure sensing unit 24 issues the pressure sensing signal in response to the exerted pressing force, the pressure sensing signal is transmitted to a control unit C on the printed circuit board 222 through the flexible circuit board 25. According to the pressure sensing signal, the control unit C issues a control signal to the processor 15 of the computing device 1. According to the control signal, the computing device 1 executes the corresponding function. Preferably but not exclusively, the pressure sensing unit 24 is a microelectromechanical system (MEMS) accelerometer. In an embodiment, the flexible circuit board 25 further includes two positioning holes h3 corresponding to the two positioning holes h2 of the second cantilever 211b. The uses of the two positioning holes h3 and the two positioning holes h2 can achieve the positioning purpose.

The operations of the touchpad module 2 will be described in more detail as follows.

Please refer to FIG. 4A and FIG. 4B again. In case that no pressing force is applied to the touch member 22, the plurality of connecting elements 23 are supported by the corresponding cantilevers 211. In other words, the first connecting elements 23a are supported by the corresponding first cantilevers 211a, and the second connecting element 23b is supported by the second cantilever 211b. Consequently, there is a first distance G1 between the touch member 22 and the elastic bracket 21.

Please refer to FIGS. 5A and 5B. When the pressing force is applied to the touch member 22, the pressing force is transmitted to at least one cantilever 211 through at least one connecting element. Consequently, at least one free end R is rotated relative to the at least one corresponding fixed end F in the direction away from the touch member 22. Consequently, the touch member 22 is moved toward the elastic bracket 21. Meanwhile, the distance between the touch member 22 and the elastic bracket 21 is changed from the first distance G1 to a second distance G2. The second distance G2 is smaller than the first distance G1. Consequently, the pressure sensing unit 24 is subjected to deformation. According to the deformation amount, the magnitude of the pressing force exerted on the touch member 22 is sensed by the pressure sensing unit 24. Consequently, the pressure sensing unit 24 issues the pressure sensing signal to the control unit C. If the magnitude of the pressure sensing signal reaches a preset threshold value, the control unit C reports to the processor 15 of the electronic computer 1 to implement the function of the left mouse button or the right mouse button.

As mentioned above, the pressure sensing unit 24 of the touchpad module 2 is located near the geometric center of the touch member 22. In case that two pressing forces with the same magnitude are individually applied to the geometric center of the touch member 22 and an edge of the touch member 22, the pressure values detected by the pressure sensing unit 24 are distinguished because the distances between the force-exerting points and the pressure sensing unit 24 are different.

In an embodiment, the touch member 22 further includes a firmware S, and the firmware S is stored in the control unit C. The execution of the firmware S can calibrate the touch pressure sensitivity everywhere on the touch member 22. Consequently, the touch pressure sensitivity everywhere on the touch member 22 is controlled to be within a tolerance range. For example, the tolerance range is ten percent. It is noted that the tolerance range may be determined according to the practical requirements.

For example, when the pressing force is applied to the position near the geometric center of the touch member 22 by the user, the pressing force is transmitted to the second free end R2 of the second cantilever 211b through the second connecting element 23b. Consequently, the second free end R2 is rotated relative to the second fixed end F2 in the direction away from the touch member 22, and the touch member 22 is moved toward the elastic bracket 21. Furthermore, the pressure sensing unit 24 is subjected to deformation, and the pressure sensing unit 24 issues the pressure sensing signal to the control unit C. If the magnitude of the pressure sensing signal reaches the preset threshold value (e.g., 150 grams), the control unit C reports to the processor 15 of the electronic computer 1 to implement the function of the left mouse button or the right mouse button.

When the pressing force with the same magnitude is applied to the position near the corner of the touch member 22 by the user, i.e., the pressing force is applied to the edge or rim of the touch member 22, the pressing force is transmitted to the first free end R1 of at least one first cantilever 211a through the corresponding first connecting element 23a. Consequently, the first free end R1 is rotated relative to the corresponding first fixed end F1 in the direction away from the touch member 22, and the touch member 22 is moved toward the elastic bracket 21. Furthermore, the pressure sensing unit 24 is subjected to deformation, and the pressure sensing unit 24 issues the pressure sensing signal to the control unit C. However, since the distance between the first cantilever 211a and the pressure sensing unit 24 is longer than the distance between the second cantilever 211b and the pressure sensing unit 24, the deformation amount of the pressure sensing unit 24 in response to the pressing force with the same amount will be different. That is, the magnitude of the pressing force exerted on the touch member 22 and sensed by the pressure sensing unit 24 is different. After the calibration by the firmware S, the touch pressure sensitivity everywhere on the touch member 22 is adjusted to be within the tolerance range (e.g., in the range between −10% and +10%). Due to this design, the purpose of achieving uniform touch pressure sensitivity everywhere on the touch member 22 will be achieved.

From the above descriptions, the touchpad module of the present invention is advantageous over the conventional touchpad module. According to the technologies of the present invention, a single pressure sensing unit 24 is used to sense the pressing force for the small-area touchpad module, e.g., the touchpad module with the area smaller than 120 mm×70 mm. The overall structure is relatively simple while effectively reducing the production cost and the overall weight.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of the computing device, the touchpad module comprising:

an elastic bracket comprising a plurality of cantilevers, wherein the plurality of cantilevers have respective free ends and respective fixed ends, and each of the free ends is rotatable relative to the corresponding fixed end;

a touch member located over the elastic bracket, wherein the touch member is movable relative to the elastic bracket;

a plurality of connecting elements installed on the corresponding free ends, wherein the plurality of connecting elements are connected with the respective free ends and the touch member; and a pressure sensing unit arranged between the elastic bracket and the touch member, wherein the pressure sensing unit is located near a geometric center of the elastic bracket and a geometric center of the elastic bracket of the touch member, wherein when the touch member is pressed in response to an external force, the external force is transmitted to at least one free end of the free ends through at least one of the plurality of connecting elements, the at least one free end is rotated relative to the at least one fixed end in a direction away from the touch member, the touch member is moved toward the elastic bracket, and the pressure sensing unit is subjected to deformation, wherein according to the deformation, the pressure sensing unit senses a magnitude of a pressing force exerted on the touch member and generates a corresponding pressure sensing signal.

2. The touchpad module according to claim 1, wherein the plurality of cantilevers are classified into a plurality of first cantilevers and a second cantilever, wherein the first cantilevers are located near edges of the elastic bracket and the touch member, and the second cantilever is located near the geometric center of the elastic bracket.

3. The touchpad module according to claim 2, wherein the plurality of first cantilevers have respective first free ends and respective first fixed end, and the second cantilever has a second free end and a second fixed end, wherein each of the first free ends is rotatable relative to the corresponding first fixed end, and the second free end is rotatable relative to the second fixed end.

4. The touchpad module according to claim 3, wherein the plurality of connecting elements are classified into a plurality of first connecting elements and a second connecting element, wherein the plurality of first connecting elements are respectively disposed on the first free ends of the corresponding first cantilevers, and the second connecting element is disposed on the second free end of the second connecting element.

5. The touchpad module according to claim 4, wherein the pressure sensing unit is installed on the second cantilever, and the pressure sensing unit is located beside the second connecting element.

6. The touchpad module according to claim 5, wherein the second cantilever further comprises a perforation, and the pressure sensing unit is accommodated within the perforation.

7. The touchpad module according to claim 4, wherein the plurality of first connecting elements and the second connecting element are made of elastic material.

8. The touchpad module according to claim 7, wherein the elastic material is liquid silicon rubber (LSR).

9. The touchpad module according to claim 1, wherein the touch member has two long sides and two short sides, wherein the two long sides are opposed to each other, the two short sides are opposed to each other, each of the two long sides is adjacent to the two short sides, and each of the two short sides is adjacent to the two long sides, wherein a length of the long side of the touch member is not greater than 120 mm, and a length of the short side of the touch member is not greater than 70 mm.

10. The touchpad module according to claim 1, wherein the pressure sensing unit is a microelectromechanical system (MEMS) accelerometer.

11. The touchpad module according to claim 1, wherein the touch panel module further comprises a flexible circuit board, wherein the flexible circuit board is arranged between the touch member and the pressure sensing unit, and the flexible circuit board is electrically connected with the touch member and the pressure sensing unit.

12. The touchpad module according to claim 1, wherein the touch panel module further comprises a control unit, and the control unit is installed on the touch member, wherein the control unit comprises a firmware that calibrates a touch pressure sensitivity of the touch member.

13. A computing device, comprising:
a casing, wherein a fixing frame is concavely formed in the casing;
a processor disposed within the casing; and
a touchpad module disposed within the casing and electrically connected with the processor, wherein the touchpad module comprises:
an elastic bracket comprising a plurality of cantilevers, wherein the plurality of cantilevers have respective free ends and respective fixed ends, and each of the free ends is rotatable relative to the corresponding fixed end;
a touch member located over the elastic bracket, wherein the touch member is movable relative to the elastic bracket;
a plurality of connecting elements installed on the corresponding free ends, wherein the plurality of connecting elements are connected with the respective free ends and the touch member; and
a pressure sensing unit arranged between the elastic bracket and the touch member, wherein the pressure sensing unit is located near a geometric center of the elastic bracket and a geometric center of the elastic bracket of the touch member,
wherein when the touch member is pressed in response to an external force, the external force is transmitted to at least one free end of the free ends through at least one of the plurality of connecting elements, the at least one free end is rotated relative to the at least one fixed end in a direction away from the touch member, the touch member is moved toward the elastic bracket, and the pressure sensing unit is subjected to deformation, wherein according to the deformation, the pressure sensing unit senses a magnitude of a pressing force exerted on the touch member and generates a corresponding pressure sensing signal.

* * * * *